324-77 SR SEARCH ROOM
OR 2,752,589 7
X324-78

June 26, 1956 C. O. DE LONG, JR 2,752,589

AUTOMATIC SIGNAL LEVEL VERSUS TIME ANALYZER

Filed July 20, 1953 2 Sheets-Sheet 1

INVENTOR.
CLIVE O. DELONG JR.
BY Marvin Moody
ATTORNEY

INVENTOR.
CLIVE O. DELONG JR.
BY Marvin Moody
ATTORNEY

2,752,589

AUTOMATIC SIGNAL LEVEL VERSUS TIME ANALYZER

Clive O. De Long, Jr., Irving, Tex., assignor to Collins Radio Company, Cedar Rapids, Iowa, a corporation of Iowa Application July 20, 1953, Serial No. 368,886
6 Claims. (Cl. 340—253)

This invention relates in general to a signal level analyzer and in particular to means for indicating what percentage of time a signal exceeds a predetermined level.

It is oftentimes desirable in electronics to determine the variations in signal level as a function of time. For example, under general statistical theory, it is known that to obtain prefect transmission of intelligence one hundred percent of the time, an extremely high power must be used at the transmitter and this amount of power may be so large as to be impractical. Thus, a smaller amount of power which would assure good communication, say 99% of the time, would be much more feasible.

It is an object of this invention, therefore, to provide an apparatus which directly indicates the percentage of time that a received signal exceeds a predetermined level.

It is another object of this invention to provide an automatic signal level versus time analyzer.

It is yet another object of this invention to provide an apparatus which directly indicates the percentage of time that a signal exceeds a predetermined level.

Further objects, features and advantages of this invention will become apparent from the following description and claims which read in view of the drawings, in which:

Figure 1:
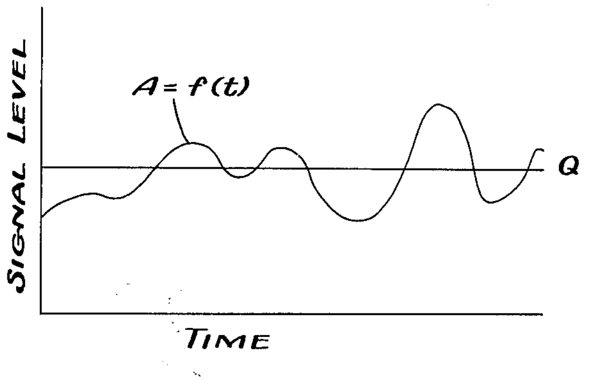
Figure 1 illustrates a sample received-signal-level plotted against time.

Figure 1 illustrates a curve A which represents a signal level plotted against time. The signal level may be given in decibels above or below some reference signal level or may be in millivolts or any other suitable units. If a particular reference signal level Q is drawn as a horizontal line on the graph, it will be noted that the signal exceeds this predetermined level Q part of the time but falls below this level at other times. As the reference level Q is lowered, the signal will exceed it a larger percentage of time until finally in the particular function shown in Figure 1, it will exceed it one hundred percent of the time.

It is to be realized, of course, that the function shown in Figure 1 is merely an example and signals with much greater excursions may be encountered in practice.

The problem presented, therefore, is to be determine directly and automatically the percentage of time that the signal exceeds the level Q.

Figure 2:
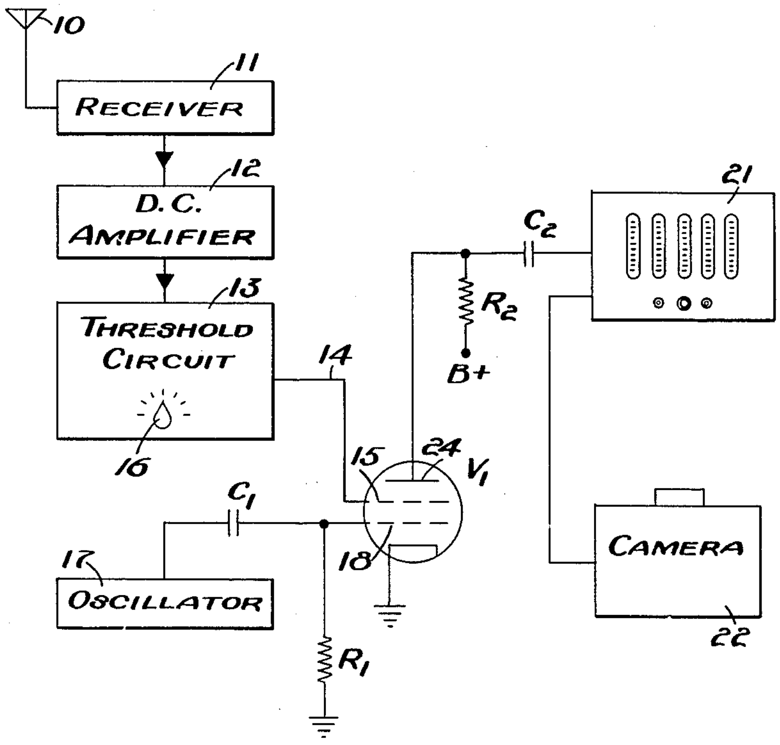
Figure 2 illustrates apparatus according to this invention.

Apparatus for accomplishing this is shown in Figure 2 wherein a receiving antenna 10 receives the incoming signal and furnishes it to a receiver 11 which produces an output that varies in response to the received signal strength. A direct current amplifier 12 receives the output of the receiver 11 and a threshold circuit 13 receives the output of the amplifier 12.

The output of the threshold circuit 13 is furnished to a lead 14 to a grid 15 of a gate tube $V_1$. It is to be noted that the threshold circuit 13 has a manual threshold adjustment 16.

A reference timing oscillator 17 may be crystal controlled and might oscillate, for example, at 50,000 cycles per second. The output of this oscillator is supplied to a differentiating circuit comprising a condenser $C_1$ and a resistor $R_1$. Resistor $R_1$ has one side connected to ground and the other side is connected to a second grid 18 of tube $V_1$.

The cathode of tube $V_1$ may be connected to ground and the plate may be connected to a suitable B plus voltage through resistor $R_2$. A blocking condenser $C_2$ couples the output of plate 24 to an electronic counter 21 which might be, for example, a Berkeley counter. These instruments are obtainable from Berkeley Scientific Division of Beckman Instruments, Inc., whose address is 2200 Wright Avenue, Richmond, California. Such counters are well known to those skilled in the art and will not be described in detail herein. In general such counters comprise a plurality of trigger circuits which are coupled to indicators to read directly the number of pulses received during a predetermined time.

Periodically the counters are re-cycled and reset to zero and count again for a predetermined interval. The interval might, for example, be one second and the indication may occur for five seconds after each countering interval. A camera 22 may be electrically connected to the counter 21 so as to periodically photographically record the reading of the counter as a function of time.

To more completely understand the operation of the apparatus shown in Figure 2, let it be assumed that a signal with an amplitude distribution such as shown in Figure 1 is received by the antenna 10 and let it be assumed further that the receiver 11 and amplifier 12 have linear characteristics such that minimum distortion will occur. The level Q may be established by the threshold circuit 13. The threshold circuit might comprise a potentiometer that determines the level at which the gate tube $V_1$ will conduct.

In other words, if the signal level supplied to the grid 15 is above the predetermined level Q, the tube $V_1$ will conduct but if it is below this level the tube $V_1$ will not conduct. Thus, means are provided for allowing the tube $V_1$ to conduct at times when the signal level is above the preset level Q.

The oscillator 17 may be crystal controlled and might have a frequency of 50,000 cycles per second. It supplies an output to the differentiator comprising $C_1$ and R which changes the sine wave of the oscillator output to a series of positive and negative pulses.

These pulses are connected to the grid 18 of the gate tube $V_1$ and will pass to the counter 21 through the blocking condenser $C_2$ when the voltage on the gate grid 15 is above the level Q.

The differentiating circuit comprising $C_1$ and $R_1$ will form twice the number of pulses per second as the frequency of the oscillator 17. This is because a pulse will be formed on the positive and negative half cycles.

The counter 21 may be set to count for one second and it will count the number of pulses from the oscillator 17 and differentiating circuit that pass the gate tube $V_1$. Thus, if 100,000 pulses per second are supplied to the grid 18 and the counter 21 receives 37,500 of them, this means that the signal level of the incoming signal received at the antenna 10 exceeded the level Q thirty-seven and one-half percent of the time. It is obvious that as the level Q is lowered, the counter will record a larger number of pulses during each counter interval and will therefore indicate a larger percentage.

Figure 3:
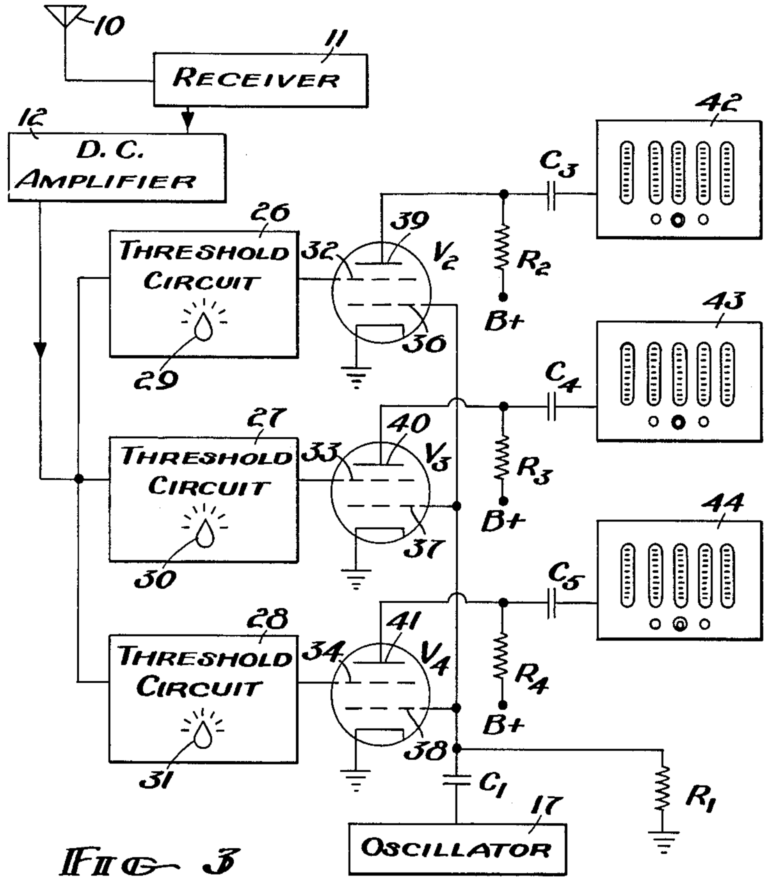
Figure 3 illustrates a modification of this invention which indicates simultaneously the percentage of time that a plurality of reference signal levels are exceeded.

A further modification of the invention is shown in Figure 3 wherein the output of the amplifier 12 is fed to a plurality of threshold adjusting circuits 26, 27 and 28 which have individual threshold adjustment controls 29, 30 and 31. A plurality of gate tubes $V_2$, $V_3$ and $V_4$ have their gate grids 32, 33 and 34 connected to the outputs of threshold circuits 26, 27 and 28.

Second grids 36, 37 and 38 of the gate tubes are connected to the outputs of the oscillator 17 through the differentiating circuit comprising $C_1$ and $R_1$.

The plates 39, 40 and 41 of tubes $V_2$, $V_3$ and $V_4$ are connected to suitable B plus supplies through resistors $R_2$, $R_3$ and $R_4$. A plurality of counters 42, 43 and 44 are connected to the plate circuits of the gate tubes $V_2$, $V_3$ and $V_4$ through coupling condensers $C_3$, $C_4$ and $C_5$.

Thus, if the threshold of all three threshold circuits 26, 27 and 28 are independently adjusted to different values, the counters 42, 43 and 44 will, respectively, indicate the percentage of time that the signal level exceeds the preset thresholds.

Figure 4:
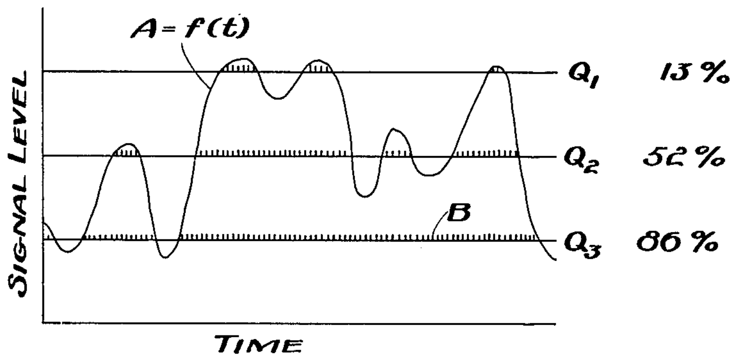
Figure 4 is a graph of signal level versus time for the apparatus shown in Figure 3.

This may be better understood by considering Figure 4 wherein three different values of Q which might correspond to individual settings of the various threshold circuits are indicated. It is to be noted that the value $Q_1$ is exceeded a relatively small percentage of time and that the level $Q_3$ is exceeded most of the time and with the level $Q_2$ at an intermediate point. The pulses from the differentiating circuit comprising $C_1$ and $R_1$ are indicated as short vertical lines B and it is to be noted that many more of them pass at the level $Q_3$ than at the level $Q_1$.

Since the counters 42, 43 and 44 indicate the number of pulses which pass through the gate tubes $V_2$, $V_3$ and $V_4$, the percentage of time that the particular level is exceeded will be directly indicated.

It is seen that this invention provides means for determining automatically the percentage of time that a reference level is exceeded by an incoming signal. It is to be realized that although an incoming radio frequency signal has been used as an example, this apparatus may be used to statistically analyze any type of function which varies on a time basis.

Although this invention has been described with respect to particular embodiments thereof, it is not to be so limited as changes and modifications may be made therein which are within the full intended scope of the invention, as defined by the appended claims.

I claim:

1. Means for indicating the percentages of time which a signal is above a plurality of set levels comprising, a plurality of threshold circuits receiving said incoming signal and each adjustable independently to establish a preset reference level, a plurality of gate tubes, the first grids of each of said gate tubes connected, respectively, to the outputs of said threshold circuits, an oscillator, a pulse forming circuit connected to the output of said oscillator, the second grids of each of said plurality of gate tubes connected to the output of said pulse forming circuit, a plurality of counters connected to the plates of the plurality of gate tubes to indicate, respectively, the percentages of time that the incoming signal is above the reference levels.

2. Means for indicating the percentages of time which a signal is above a plurality of set levels comprising, an antenna, a receiver connected to said antenna, a plurality of threshold circuits receiving said incoming signal from said receiver and each adjustable independently to establish a preset reference level, a plurality of gate tubes, the first grids of each of said gate tubes connected, respectively, to the outputs of said threshold circuits, an oscillator, a pulse forming circuit connected to the output of said oscillator, the second grids of each of said plurality of gate tubes connected to the output of said pulse forming circuit, and a plurality of counters connected to the plates of the plurality of gate tubes to indicate, respectively, the percentages of time that the incoming signal is above the reference levels.

3. Means for determining the fraction-of-time that an input time-varying signal is above a preset voltage level, comprising means for receiving and detecting the variation of level for said input signal, threshold circuit means for imposing on the detected output of said first-named means a given direct-voltage component which determines said preset voltage level, oscillator means for providing an output with a predetermined frequency, gating means for passing the output of said oscillator when the instantaneous output of said threshold circuit exceeds a given direct-voltage level, and means for counting the number of cycles of output from said gating means over a predetermined time interval.

4. Means for determining the percentage-of-time that an input time-varying signal is above a preset level, comprising means for detecting and amplifying the variation in level of said input signal, gating circuit means for receiving one signal and passing it only when another received signal exceeds a predetermined direct-voltage level, an oscillator with a frequency output that is an integer power of ten cycles per second, said oscillator connected to said gating circuit means to provide said one signal, a threshold circuit connected between said gating circuit means and said detecting and amplifying means to provide said another signal to said gating circuit, said threshold circuit controlling the direct-voltage level of its output signal, differentiating means serially connected to said gating circuit means to form pulses of the oscillator voltage, and a pulse counter connected to the output of said gating means to count the pulses provided from the output of said gating circuit means over a predetermined interval-of-time.

5. Means for determining the percentage-of-time that an input time-varying signal is above a preset level, comprising receiving means for detecting and amplifying said input signal, a frequency source that provides a frequency that is an integer power of ten cycles per unit of time, said frequency being a counting base for determining said percentage-of-time, gating circuit means connected to said frequency source for passing said frequency in response to a gating signal, threshold circuit means connected between said receiving means and said gating circuit means to provide the gating signal to said gating means by clipping said input signal at a given threshold level, and counting means for determining the number of cycles of output provided from said gating circuit means over a given interval-of-time.

6. Means for determining the fraction-of-time that an input time-varying signal is above a preset level, comprising an antenna for receiving said input signal, a receiver connected to said antenna to amplify and detect the level variation of said signal, a direct-current amplifier connected to the output of said receiver to amplify the detected signal, an oscillator providing a given frequency output, a circuit comprising a capacitor and a resistor connected in series across the output of said oscillator, an electron tube having an input connected across said resistor, another control electrode of said electron tube having a given cutoff level for said tube, a threshold circuit connected between the output of said direct-current amplifier and said another control electrode, said threshold circuit including means for varying the direct-current level of the signal with respect to the cutoff level of said another control electrode, a counter connected to the output of said electron tube to count the number of cycles of output occurring over a given interval-of-time.

References Cited in the file of this patent

UNITED STATES PATENTS

| | | |
|---|---|---|
| 2,050,852 | Moore | Aug. 11, 1936 |
| 2,305,845 | Cockerell | Dec. 22, 1942 |
| 2,367,329 | Berger | Jan. 16, 1945 |
| 2,515,677 | Usselman | July 18, 1950 |
| 2,528,744 | Fehr | Nov. 7, 1950 |
| 2,605,332 | Parsons | July 29, 1952 |
| 2,646,559 | Mutzler | July 21, 1953 |
| 2,679,639 | Locker | May 25, 1954 |